C. F. MADDEN.
PLUMBING STRUCTURE.
APPLICATION FILED JUNE 20, 1910.
1,007,463.
Patented Oct. 31, 1911.
2 SHEETS—SHEET 1.
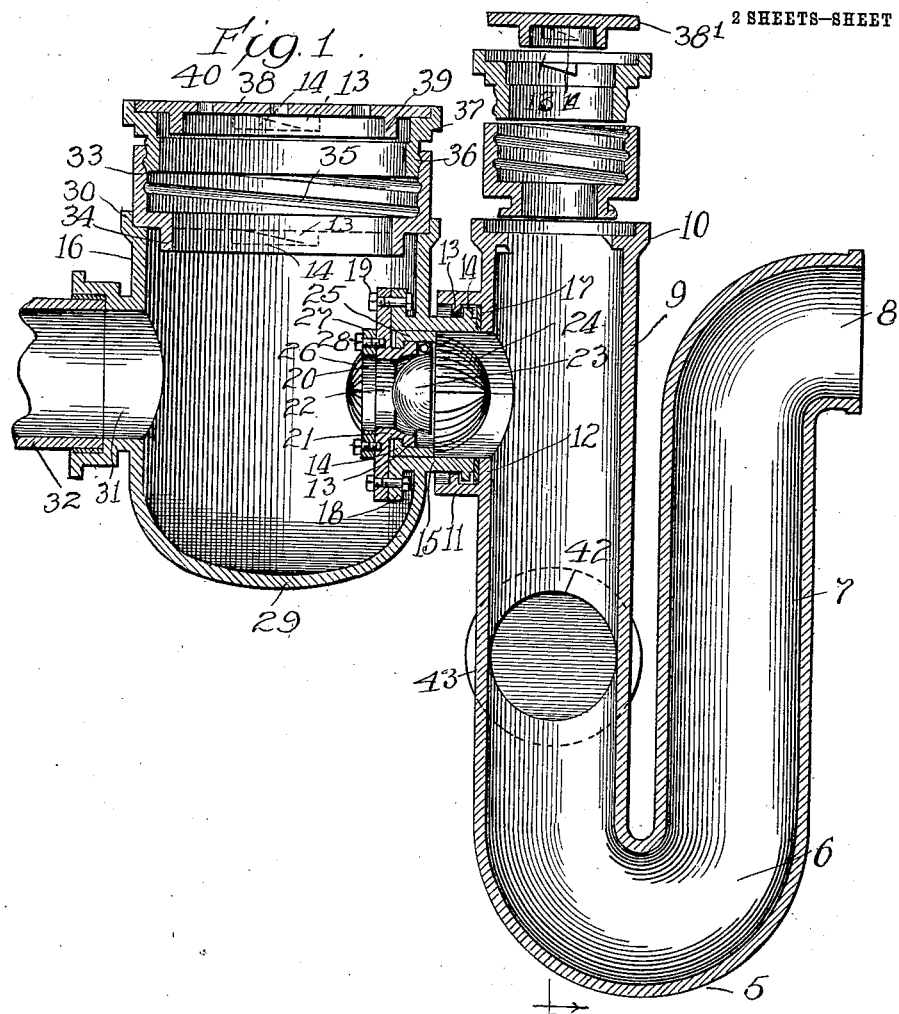
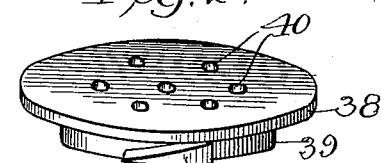
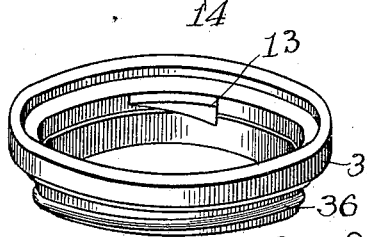
Witnesses
H. R. L. White
P. A. White
Inventor
Charles F. Madden,
By Hosel Bain and May, Attys C. F. MADDEN.
PLUMBING STRUCTURE.
APPLICATION FILED JUNE 20, 1910.
1,007,463.
Patented Oct. 31, 1911.
2 SHEETS—SHEET 2.
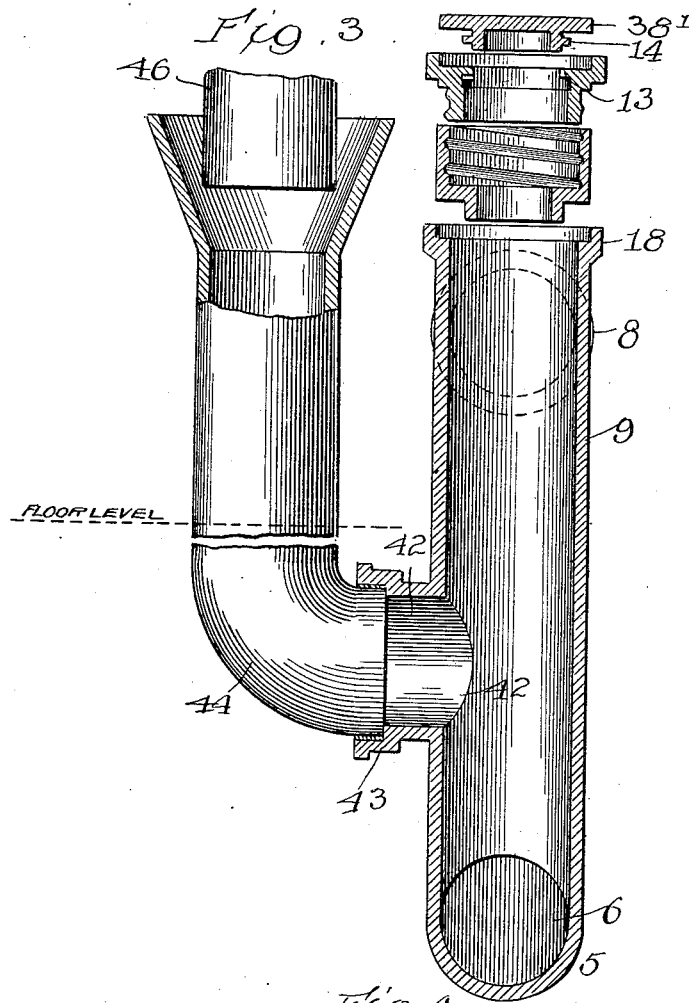
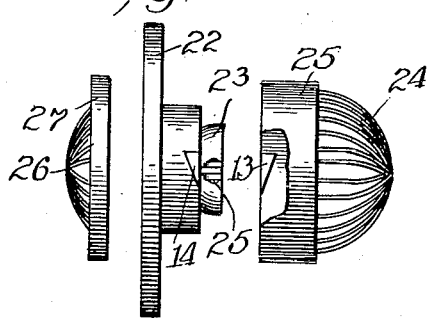
Witnesses:
H. P. L. White
R. A. White.
Inventor
Charles F. Madden
By Dere Baint May
Attys

UNITED STATES PATENT OFFICE.

CHARLES F. MADDEN, OF GREEN BAY, WISCONSIN.

PLUMBING STRUCTURE.

1,007,463.     Specification of Letters Patent.    Patented Oct. 31, 1911.

Application filed June 20, 1910. Serial No. 567,754.

*To all whom it may concern:*

Be it known that I, CHARLES F. MADDEN, a citizen of the United States, residing at Green Bay, in the county of Brown and State of Wisconsin, have invented certain new and useful Improvements in Plumbing Structures, of which the following is a specification.

My invention relates to improvements in plumbing structures and has for its salient object to provide a combined trap, settling basin, and floor drain, of simple, efficient, economical construction, suitable to be made of metal and readily applicable to widely variant conditions in practice.

In the drawings, wherein I have illustrated an embodiment of my invention, Figure 1 is a central vertical section through my appliance; Fig. 2 is a detail of two of the parts in separated relation, showing a locking lug structure; Fig. 3 is a section on line 3—3 of Fig. 1; Fig. 4 is a detail of the separated parts of the valve device.

In the embodiment of my invention, I provide a seal fitting, 5, consisting of a pipe suitably shaped to form a seal, 6, by a bend of conventional form, one vertical leg, 7, of the seal terminating at its upper end in a laterally open hub, 8, and the other leg, 9, terminating in a vertically opening hub, 10. Into the side of the leg, 9, opens a hub, 11, of suitable diameter, interiorly provided at its inner end with a flange, 12. The hub is provided with interior wedge-shaped locking projections, 13, back of which engage similar projections, 14, upon a collar, 15, which projects both inwardly and outwardly from the peripheral wall of a cylindrical receptacle fitting, 16, to bound a side opening therefrom, leading into the seal leg, 9. The coöperating locking lugs, 13 and 14, are of oppositely tapering construction, similar to the lugs shown on the parts illustrated in Fig. 2, so that when locking engagement is effected between the parts, the end of the collar, 15, is forced against the packing ring, 17, seated against the shoulder, 12. Similar locking devices I will designate by the same numerals 13 and 14 wherever they appear on the drawings. The interiorly projecting portion of the collar, 15, is flanged, as at 18, and has bolted thereto, as at 19, a valve seat member, 20, having a parti-spherical valve seat, 21, surrounding an aperture, 22, therein. The fitting 20 carries, preferably pivotally secured thereto, a parti-spherical valve, 23, which acts as a check valve closing toward the receptacle, 16. The valve and its seat are preferably protected on both sides by screens, one such screen of cage-shape, suitably constructed of wire, and shown at 24, being carried by a ring, 25, detachably secured to the part, 20, as by the engagement of locking parts, 13 and 14, on the ring 25 and part 20, respectively. The second cage member, 26, of generally similar construction is carried by a ring, 27, secured to the part 20, as by screws, 28. The receptacle, 16, extends below the lower extremity of collar, 15, to provide in its bottom portion a settling basin, 29, and it extends upward, preferably in cylindrical form, to a hub, 30, level with the hub 8 of the pipe 7. A side opening, 31 surrounded by an exterior hub, is preferably provided in the receptacle, 16, for connection thereto of a waste pipe, 32, or the like, and the opening, when not so used, may, of course, be closed by a cap, as is any idle opening in such a plumbing appliance. At the open upper end of the receptacle, 16, and of the pipe, 9, I provide extension members which may be used or not as desired, and cover members adapted to coöperate either directly with the top of the corresponding opening, or with the extension therefrom, accordingly as the extension is used or not. Thus, the receptacle, 16, bears just below the top, 30, two of the locking projections, 13, which coöperate with the locking projections, 14, of the reduced throat, 34, of an extension collar, 33, which is interiorly screw-threaded, as at 35, to receive the exteriorly threaded throat portion, 36, of the adjustable extension element, 37, which has near its top locking projections, 13, for engagement by the corresponding projections, 14, upon the throat portion, 39, of a cover 38, apertured, as at 40, this cover 38 constituting the exposed drain cover for the fitting and will be located in practice at the level of the floor to be drained. The locking construction and the size of its throat, 39, correspond with the throat 34 of the stationary extending collar 33, so that the extension device may be removed and the cover placed directly upon the receptacle, 16, if desired. The extension device for the open end 8 of pipe 7 is identical with that just described, save that its cover, 38', is preferably solid or imperforate, and its size is smaller. For additional advantage the piping leg, 9, has a side opening, 42, to the hub, 43, of which may be connected a pipe 44 extending upward a suitable distance above the floor level,—say, one or two feet in practice—and flaring at its end, as at 45, to receive in open communication any pipe 46, which under good plumbing conditions should not have such connection with the sewer as possibly to receive backwater therefrom.

It will be apparent that in practice the plumbing appliance will be installed below the level of the floor to be drained, the floor generally being laid after the fitting is emplaced. Thus, slight variations in the floor level finally to be maintained may be compensated for by adjustment of the extension member 36 so as to bring the cover member, 38, to the desired level, and similar adjustment may be made with respect to the extensions of the pipe 9. The bottom portion of the receptacle, 16, provides a settling trap, and the outwardly opening valve, 23, permits the passage of drainage into the sewer piping with which, of course, the leg 8 of fitting 5 communicates. The check valve will, however, close to prevent flooded sewers from forcing water into the dwelling through the drain, and the cages or screens protect the valves against being disabled by the lodgment therein of any large bodies of material. The open connection of pipes 44 and 46, should be at such elevation as practically to preclude back pressure from the sewers ever causing an overflow, but it prevents absolutely the possibility of sewer-water backing up into the receptacle, say a cistern, with which the pipe is connected at its receiving end.

It will be apparent that the construction is one of simplicity, designed to be made entirely of metal, capable of being easily and quickly installed, and adjustable to suit varying conditions of use and subsequent changes in floor level after installation.

While I have herein described in some detail a particular embodiment of my invention, it will be apparent to those skilled in the art that numerous changes might be made in the details of construction without departure from the spirit of the invention and within the scope of the appended claims.

What I claim is:

1. A floor drain comprising two main parts one of which is a pipe member, bent to provide a deep seal bend with an inlet leg terminating at its top with a horizontal opening at floor level, and its opposite leg terminating in a lateral opening just below the end plane of the first said leg, said inlet leg having a lateral outlet opening near the level of the lateral outlet opening of the opposite leg; and the other principal part comprising a catch basin having an inlet opening at its end at floor level, and having a single lateral outlet opening above its bottom, communicating with the side opening of the inlet leg of the pipe member.

2. A plumbing fitting comprising two separate parts, one consisting of a pipe bent to provide a deep seal bend with an inlet leg terminating at its top in a horizontal hub and its opposite leg terminating in a lateral opening just below the said hub, the inlet leg having a lateral inlet opening remote from said seal bend; and the other part providing a receptacle having a settling space in its bottom and a side opening above said settling space, the top of said receptacle being flush with the hub of the seal bend; means for securing said two parts together with their side openings in register and communication, and extension means applied to the top opening of each said part for adjustment of the effective relation between the plane of said top openings and the elevation of the outlet opening from the seal bend.

3. In a floor drain, two principal parts, one consisting of a pipe bent to form a deep seal bend with an inlet leg terminating at its top with a horizontal opening at floor level and its opposite leg terminating in a lateral outlet opening just below floor level, said inlet leg having a lateral inlet opening near the level of the lateral outlet opening in the opposite leg; and the other part consisting of a catch basin having an inlet opening at its end at said floor level, and a lateral outlet opening above its bottom and at the level of said lateral inlet to the pipe member, means integral with said two parts to connect them together for communication between said catch basin outlet and pipe member inlet, and a pipe at one end communicating with the inlet leg of said pipe member between the bend thereof and the lateral inlet thereto, and at the other end providing a flared portion, for the purposes described.

4. A plumbing fitting comprising two separate parts, one consisting of a pipe shaped to form a seal bend, having an outlet leg terminating in a lateral opening, and an inlet leg terminating in a horizontal opening slightly above the outlet opening, and having a side inlet opening into the inlet leg, near the level of the outlet opening from the outlet leg, and the other part comprising a relatively shallow circular catch basin having its bottom curved throughout, having a side opening above the bottom, and its inlet opening level with the horizontal inlet opening of the other members, means connecting said two parts with their side openings in register and communication, a check valve controlling such communication, cover members for the receptacle and the horizontal inlet to the pipe, and extension members adjustable between the cover members and said two parts of the plumbing fitting to vary the height of said cover members above the outlet opening for the pipe member.

In testimony whereof I hereunto set my hand in the presence of two witnesses.

CHARLES F. MADDEN.

In the presence of—
ALBERT KAAP,
JEAN BROWN.

Copies of this patent may be obtained for five cents each, by addressing the "Commissioner of Patents, Washington, D. C."